(12) United States Patent
Zhao et al.

(10) Patent No.: US 11,909,839 B2
(45) Date of Patent: *Feb. 20, 2024

(54) EVENT NOTIFICATION METHOD, SYSTEM, SERVER DEVICE, AND COMPUTER STORAGE MEDIUM

(71) Applicants: BEIJING BOE TECHNOLOGY DEVELOPMENT CO., LTD., Beijing (CN); BOE TECHNOLOGY GROUP CO., LTD., Beijing (CN)

(72) Inventors: Junjie Zhao, Beijing (CN); Jing Su, Beijing (CN); Xinan Wang, Beijing (CN); Shaobei Chen, Beijing (CN); Qian Zhang, Beijing (CN); Yanqiu Zhao, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/642,740

(22) PCT Filed: Sep. 14, 2020

(86) PCT No.: PCT/CN2020/115074
§ 371 (c)(1),
(2) Date: Mar. 14, 2022

(87) PCT Pub. No.: WO2021/052289
PCT Pub. Date: Mar. 25, 2021

(65) Prior Publication Data
US 2022/0329669 A1    Oct. 13, 2022

(30) Foreign Application Priority Data
Sep. 16, 2019 (CN) .......................... 201910872383.4

(51) Int. Cl.
*H04L 67/55* (2022.01)
*H04L 67/51* (2022.01)
*H04L 67/60* (2022.01)

(52) U.S. Cl.
CPC .............. *H04L 67/55* (2022.05); *H04L 67/51* (2022.05); *H04L 67/60* (2022.05)

(58) Field of Classification Search
CPC .......... H04L 67/51; H04L 67/55; H04L 67/60
See application file for complete search history.

(56) References Cited

U.S. PATENT DOCUMENTS 10,476,758 B2    11/2019   Marvin et al.
11,080,107 B2 *   8/2021   Zhao ..................... G06F 9/5061
(Continued)

FOREIGN PATENT DOCUMENTS

CN    101159711 A    4/2008
CN    102687134 A    9/2012
(Continued)

OTHER PUBLICATIONS

U.S. Office Action from U.S. Appl. No. 16/519,525 dated Jun. 1, 2020.
(Continued)

*Primary Examiner* — Jeong S Park
(74) *Attorney, Agent, or Firm* — Dilworth & Barrese, LLP.; Michael J. Musella, Esq.

(57) ABSTRACT

The present disclosure provides an event notification method, a system, a server device, and a computer storage medium. The event notification method includes: receiving a subscription request from a subscriber, the subscription request includes at least one receiver for receiving event notifications; during a monitoring interval, determining whether a continuous event notification rule is satisfied; and in the case where the continuous event notification rule is
(Continued)

satisfied, sending the event notification of the subscription request to the at least one receiver.

12 Claims, 9 Drawing Sheets

(56) References Cited

U.S. PATENT DOCUMENTS

| | | |
|---|---|---|
| 2003/0046395 A1 | 3/2003 | Fleming et al. |
| 2007/0016674 A1* | 1/2007 | Shinohara ............ H04L 67/1001 709/224 |
| 2010/0250682 A1* | 9/2010 | Goldberg .............. H04L 51/234 709/206 |
| 2011/0055642 A1* | 3/2011 | Kaneko ................. G06Q 30/06 714/57 |
| 2011/0161397 A1 | 6/2011 | Bekiares et al. |
| 2016/0125725 A1 | 5/2016 | Sager et al. |
| 2017/0374645 A1* | 12/2017 | Tirronen ............ H04W 52/0216 |
| 2018/0129406 A1* | 5/2018 | Landefeld ............ G06F 3/04847 |
| 2019/0069243 A1* | 2/2019 | Bean ..................... G06F 1/3209 |
| 2019/0230175 A1* | 7/2019 | Wang, IV ............... H04L 67/55 |
| 2019/0313212 A1 | 10/2019 | Lee et al. |
| 2019/0340041 A1 | 11/2019 | Banisadr et al. |
| 2020/0366577 A1* | 11/2020 | Sapra .................. H04W 64/003 |
| 2021/0152653 A1 | 5/2021 | Guo et al. |

FOREIGN PATENT DOCUMENTS

| | | |
|---|---|---|
| CN | 102523137 B | 10/2014 |
| CN | 106683331 A | 5/2017 |
| CN | 106973118 A | 7/2017 |
| CN | 107770754 A | 3/2018 |
| CN | 107698805 A | 4/2018 |
| EP | 3148156 A1 | 3/2017 |
| WO | 2015/117417 A1 | 8/2015 |
| WO | 2018/205532 A1 | 11/2018 |

OTHER PUBLICATIONS

Chinese First Office Action dated Jan. 4, 2022 in Chinese Application No. 201811454645.7.
Extended European Search Report issued by the European Patent Office for corresponding patent application No. 20866007.6. The EESR dated Aug. 25, 2023.
"3rd Generation Partnership Project; Technical Specification Group Services and System Aspects; Procedured for the 5G System; Stage 2 (Release 1 6)" Jun. 11, 2019, pp. 1-500, vol. SA WG2, No. V16.1.0, Sophia Antipolis Cedex, France.

* cited by examiner

EVENT NOTIFICATION METHOD, SYSTEM, SERVER DEVICE, AND COMPUTER STORAGE MEDIUM

TECHNICAL FIELD

Embodiments of the present disclosure relate to the field of Internet of Things, in particular to an event notification method, an event notification system, a server device, and a computer storage medium.

BACKGROUND

With the development of information technology, especially Internet technology, the Internet of Things technology, which is used to realize informatization, remote management control, and intelligence, is gradually maturing. The Internet of Things connects sensors, controllers, machines, human and objects in a new way by using communication technologies such as the local network or the Internet, and forms the connections between human and things, and between things. With the rapid development of Internet of Things technology in various application fields, more and more devices are connected to the Internet of Things, and various new application fields such as smart home, intelligent transportation, smart health and so on have emerged. The terminal devices which are connected to the Internet of Things can obtain data or event notifications by transmitting subscription requests to the server devices. In the case where the subscription conditions are satisfied, the Internet of Things platform can transmit data or event notifications to the notifiers in the subscription requests.

SUMMARY

At least one embodiment of the present disclosure provides an event notification method, which includes: receiving a subscription request from a subscriber; determining whether a continuous event notification rule is satisfied during a monitoring time interval; and transmitting the event notification for the subscription request to the at least one receiver in the case where the continuous event notification rule is satisfied. The subscription request includes at least one receiver used for receiving an event notification.

For example, the event notification method provided by at least one embodiment of the present disclosure further includes acquiring at least one pieces of monitored data during the monitoring time interval. Determining whether the continuous event notification rule is satisfied includes: for each of the at least one pieces of monitored data, determining whether an event notification rule is satisfied.

For example, the event notification method provided by at least one embodiment of the present disclosure further includes acquiring at least one pieces of monitored data during the monitoring time interval. Determining whether the continuous event notification rule is satisfied includes: for each of the at least one pieces of monitored data, determining whether an event notification rule is satisfied; determining the number of the pieces of monitored data satisfying the event notification rule; and determining the continuous event notification rule is satisfied in the case where the number is not less than a counting threshold. The counting threshold is determined based on the number of the pieces of monitored data received during the monitoring time interval.

For example, the event notification method provided by at least one embodiment of the present disclosure further includes acquiring at least one pieces of monitored data during the monitoring time interval. Determining whether the continuous event notification rule is satisfied includes: for each of the at least one pieces of monitored data, determining whether an event notification rule is satisfied; determining the time length during which the event notification rule is satisfied based on a time interval for the pieces of monitored data satisfying the event notification rule; and determining the continuous event notification rule is satisfied in the case where a ratio of the time length to the monitoring time interval is not less than a time threshold. The time threshold is less than or equal to 1.

For example, in the event notification method provided by at least one embodiment of the present disclosure, the event notification rule includes any one of: a value of a piece of monitored data being greater than a monitoring threshold; the value of the piece of monitored data being equal to the monitoring threshold; the value of the piece of monitored data being less than the monitoring threshold; the value of the piece of monitored data being not less than the monitoring threshold; and the value of the piece of monitored data being not greater than the monitoring threshold.

For example, the event notification method provided by at least one embodiment of the present disclosure further includes acquiring at least one pieces of monitored data during the monitoring time interval. Determining whether the continuous event notification rule is satisfied includes: in a case that it is determined that an event notification rule is satisfied, for the at least one pieces of monitored data, determining whether a monitored data rule is satisfied and obtaining monitored results, and determining whether the continuous event notification rule is satisfied based on the monitored results.

For example, in the event notification method provided by at least one embodiment of the present disclosure, the event notification rule includes at least one of the following: updating an attribute of a subscribed resource; creating a sub-resource of the subscribed resource; deleting the sub-resource of the subscribed resource; acquiring a content instance sub-resource of a subscribed container resource; receiving an operation request from a requester; and receiving a request for a certain type of operation, and the monitored data rule includes any one of the following: the monitored data rule comprises any one of the following: a value of a piece of monitored data being greater than a monitoring threshold; the value of the piece of monitored data being equal to the monitoring threshold; the value of the piece of monitored data being less than the monitoring threshold; the value of the piece of monitored data being not less than the monitoring threshold; and the value of the piece of monitored data being not greater than the monitoring threshold.

For example, in the event notification method provided by at least one embodiment of the present disclosure, determining whether the monitored data rule is satisfied and obtaining the monitored results includes: for each piece of monitored data of the at least one pieces of monitored data, determining whether the piece of monitored data satisfies the monitored data rule, obtaining a monitored result that the monitored data rule is satisfied in a case that the piece of monitored data satisfies the monitored data rule; and obtaining the monitored result that the monitored data rule is not satisfied in a case that the piece of monitored data does not satisfy the monitored data rule.

For example, in the event notification method provided by at least one embodiment of the present disclosure, determining whether the continuous event notification rule is satisfied includes: determining a number of monitored results that the monitored data rule is satisfied; and determining the continuous event notification rule is satisfied in the case where the number of monitored results that the monitored data rule is satisfied is not less than a counting threshold, wherein the counting threshold is determined based on the number of pieces of monitored data received during the monitoring time interval.

For example, in the event notification method provided by at least one embodiment of the present disclosure, determining whether the continuous event notification rule is satisfied includes: determining a time length corresponding to the monitored results that the monitored data rule is satisfied; determining the continuous event notification rule is satisfied in a case where a ratio of the time length to the monitoring time interval is not less than a time threshold, wherein the time threshold is less than or equal to 1.

For example, the event notification method provided by at least one embodiment of the present disclosure further includes determining a start time point and an end time point of the monitoring time interval. The time point when the event notification rule is satisfied is determined as the start time point; and the end time point is determined based on the monitoring time interval and the determined start time point.

For example, the event notification method provided by at least one embodiment of the present disclosure further includes determining a start time point and an end time point of the monitoring time interval. The time point when the event notification rule is satisfied is determined as the end time point; and the start time point is determined based on the monitoring time interval and the determined end time point.

For example, the event notification method provided by at least one embodiment of the present disclosure further includes determining a start time point and an end time point of the monitoring time interval. The time point when the event notification rule is satisfied is determined as an intermediate time point; and the start time point and the end time point are determined based on the monitoring time interval and the determined intermediate time point, and the intermediate time point is between the start time point and the end time point.

For example, in the event notification method provided by at least one embodiment of the present disclosure, the subscription request further includes the monitoring time interval, and the event notification method further includes creating a subscription resource, wherein the subscription resource comprises the following attributes: a monitoring time interval attribute which is used for determining the monitoring time interval; a continuous event notification rule attribute which is used for determining whether to transmit the event notification to the at least one receiver; and an event notification list attribute which is used for storing address information for the at least one receiver.

At least one embodiment of the present disclosure also provides a server device, which includes a transceiver and a processor. The transceiver is configured to receive a subscription request from a subscriber, and the subscription request comprises at least one receiver used for receiving an event notification. The processor is configured to determine whether a continuous event notification rule is satisfied during a monitoring time interval. The transceiver is further configured to transmit the event notification for the subscription request to the at least one receiver in a case where the continuous event notification rule is satisfied.

At least one embodiment of the present disclosure also provides an event notification system, which includes a subscription device, a server device, and a monitoring device. The subscription device is configured to transmit a subscription request to a server device, and the subscription request comprises at least one receiver used for receiving an event notification. The server device is configured to: receive the subscription request from the subscription device; acquire at least one pieces of monitored data; determine whether a continuous event notification rule is satisfied during a monitoring time interval; and transmit the event notification for the subscription request to the at least one receiver in the case where the continuous event notification rule is satisfied. The monitoring device is configured to transmit monitored data to the server device.

At least one embodiment of the present disclosure also provides a computer storage medium stored with computer readable code, which when executed by one or more processors, causing the one or more processors to perform the event notification method in any one of the embodiments as described above.

BRIEF DESCRIPTION OF THE DRAWINGS

In order to more clearly illustrate the technical solutions of the embodiments of the present disclosure or in the prior art, the following briefly introduces the drawings that need to be used in the description of the embodiments or the prior art. Obviously, the drawings in the following description are only some embodiments of the present disclosure, and for the ordinary skilled in the art, other drawings can be obtained according to these drawings without inventive efforts.

DETAILED DESCRIPTION

Figure 1A:
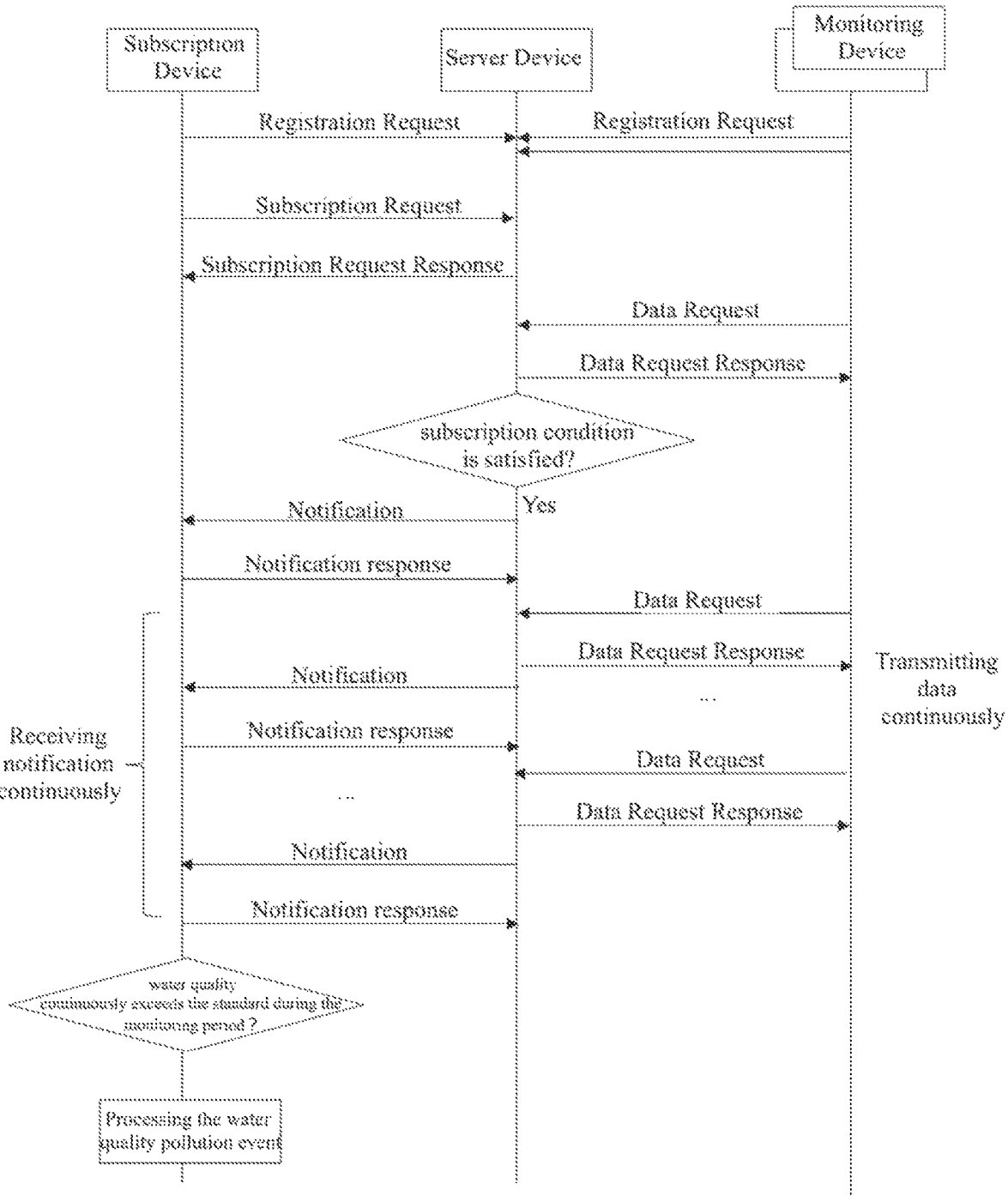
FIG. 1A illustrates a processing flowchart for an instant event notification.

The technical solutions in the embodiments of the present disclosure are clearly and completely described with reference to the drawings in the embodiments of the present disclosure. Obviously, the described embodiments are only part of the embodiments of the present disclosure, not all the embodiments. Based on the embodiments in the present disclosure, all other embodiments obtained by the ordinary skilled in the art without inventive efforts are within the scope of the present disclosure.

The words "first," "second," and similar words used in the present disclosure do not indicate any order, quantity or importance, but are only used to distinguish different components. Similarly, the words "include/including" or "comprise/comprising" indicate that the elements or objects appearing before the words encompass the elements, objects after the words, and their equivalents, but do not exclude other elements or objects. Similar words such as "connect/connecting" or "couple/coupling" are not limited to physical connection or mechanical connection, but can include connection manners such as the electrical connection, for example, the electrical connection can be direct connection or indirect connection.

The flowcharts are used in the present disclosure to illustrate the steps of methods according to the embodiments of the present disclosure. It should be understood that the preceding or following steps are not necessarily performed exactly in order. Instead, various steps can be processed in reverse order or simultaneously. Of course, other steps can also be added to these processes, or a step or steps can be removed from these processes.

As an extension of the Internet, the Internet of Things can include the Internet and all resources on the Internet, and is compatible with the applications on the Internet. With the continuing expansion of the Internet of Things applications in various fields, various new application fields, such as smart home, intelligent transportation, smart health, intelligent water quality monitoring and so on, have emerged.

More and more terminal devices are connected to the Internet of Things platform. For example, the terminal devices can be smoke alarms, fire alarms, various household appliances, water quality monitoring devices, various types of sensing devices, execution devices and the like. For example, an Internet of Things platform can be implemented as a common service entity, or called a server device. The terminal devices can be connected to the server device by transmitting registration information to the server device, and the server device manages the terminal devices which are connected to the server device. The terminal devices connected to the server device can also perform data transmission, information interaction and other operations with the server device. It should be noted that the terminal devices described herein can be all kinds of terminal devices in the field of Internet of Things, or can also be software modules in devices, and so on.

Some terminal devices (for example, as subscription devices) can subscribe to information, data, and the like, from other terminal devices (for example, as monitoring devices) by transmitting a subscription request to the server device, and the subscription devices can also request data, operations, and the like, from the server device, which is not limited herein.

The subscription request can include a subscription condition, so that the server device transmits an event notification in the case where it is determined that the subscription condition is satisfied (for example, the smoke alarm alarms). The subscription condition can also be referred to as an event notification rule. In other words, in the case where the server device determines that the event notification rule is satisfied, an event notification is transmitted.

The above manner of the event notification can be referred to as an instant event notification. FIG. 1A illustrates a processing flowchart for the instant event notification. First, a subscription device and a monitoring device may connect to a server device by transmitting a registration request to the server device. The subscription device may transmit a subscription request to the server device, and the subscription request may include an event notification rule. Taking monitoring the changes of water quality as an example, the monitoring device can be a water quality monitoring device, and the event notification rule can be that the value of water quality data monitored by the water quality monitoring device is greater than a preset threshold. The water quality monitoring device can continuously transmit the detected water quality data to the server device, and the server device can determine whether the received water quality data satisfies the event notification rule, and transmit an event notification in the case where it is determined that the value of water quality data is greater than the preset threshold (that is, the event notification rule is satisfied).

Figure 1B:
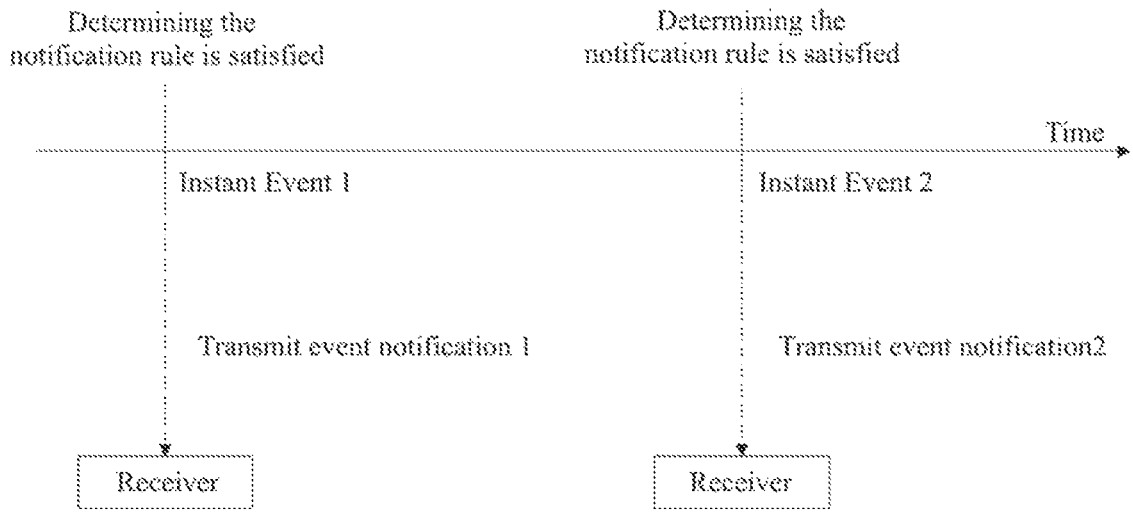
FIG. 1B illustrates a time flowchart for an instant event notification.

FIG. 1B illustrates a time flowchart for the instant event notification. Combined with FIG. 1A, it can be seen that after receiving the water quality data from the monitoring device, the server device immediately determines whether the water quality data satisfies the event notification rule, and transmits the event notification after determining that the event notification rule is satisfied. Therefore, in application scenarios such as the water quality monitoring where the water quality data needs to be continuously monitored, the monitoring device continuously transmits data to the server device, and the server device continuously transmits event notifications to the subscription device.

Further, it is necessary for the subscription device to monitor the water quality data in a certain period of time and make a determination based on the water quality data in the period of time. For example, in the above example, the subscription device is notified in the case where the value of water quality data exceeds a preset threshold. However, in the practical application scenarios, the reasons for the value of water quality data exceeding the preset threshold may include, for example, domestic sewage discharge and enterprise sewage discharge. The above two reasons both have possibilities to cause the value of water quality data to exceed the preset threshold, which may be referred to as the water quality exceeding a standard. In general, the time length for domestic sewage discharge is short, while the time length for enterprise sewage discharge is long, and it may be desired for the subscription device to strengthen the treatment for the enterprise sewage discharge. During a certain period of time, the subscription device receives continuously event notifications from the server device, and based on the above notifications, determines whether it is the domestic sewage discharge or the enterprise sewage discharge. For example, in the case where the value of water quality data continuously exceeds the standard during a monitoring period, that is, the value of water quality data continuously exceeds the preset threshold, it is determined by the subscription device that the water quality exceeding the standard is caused by the enterprise sewage discharge, and the water quality pollution event is to be processed.

Generally, in practical applications, there is a need to monitor continuous data change (or state change), such as to monitor water quality data for a period of time. In the implementations for the instant event notification described above in conjunction with FIG. 1A and FIG. 1B, the subscription device monitors continuous data change, and to implement this, the subscription device needs to continuously receive event notifications, which increases the communication load between devices and may also cause communication congestion. In addition, monitoring the continuous data change by the subscription device also increases requirements for processing capability of the subscription device.

Therefore, there is a need to provide a monitoring mechanism applied to a continuous event (an event that happens continuously). The continuous event may be such as continuous data change, continuous state change, etc., for example, water quality continuously exceeding the standard for 10 minutes, air pollution continuously exceeding the standard for 10 minutes, noise pollution continuously exceeding the standard for more than 20 minutes, faucet continuing being open for 5 minutes, door continuing being open for more than 5 minutes, etc.

The present disclosure provides an event notification method. In the method, a server device monitors a continuous event, and transmits an event notification to a subscription device in the case where it is determined that the received data satisfies a continuous event notification rule, which can improve the processing efficiency of the Internet of Things system, reduce the requirements for the processing capacity of the subscription device, avoid the communication load between devices and communication congestion, and reduce the number of the event notifications.

Figure 2:
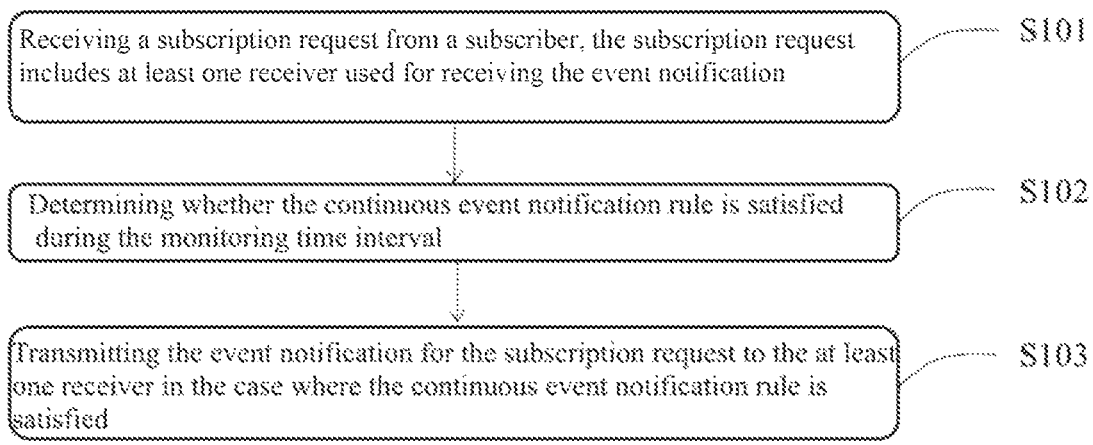
FIG. 2 illustrates a flowchart of an event notification method according to some embodiments of the present disclosure.

Specifically, FIG. 2 illustrates the flowchart of the event notification method according to some embodiments of the present disclosure. For example, the event notification method illustrated in FIG. 2 can be executed by a server device in the field of Internet of Things.

First, in step S101, a subscription request is received from a subscriber, and the subscription request includes at least one receiver used for receiving an event notification. The subscriber can be a terminal device connected to the server device or an application connected to the server device. For example, in the case where certain data is required, the subscription device can transmit a subscription request to the server device. The subscription request may include subscribed data, events or operations.

The subscriber may be one subscriber or multiple subscribers, that is, the multiple subscribers can transmit subscription requests to the server device. The receiver may be a receiving device for receiving the event notification or a receiving application for receiving the event notification. After receiving the subscription requests, the server device can obtain information of a list of all the receivers, and group the receivers based on the types and levels for the receivers, contents of the subscription requests, and so on, in order to transmit the event notification more accurately. It should be noted that the subscriber and the receiver can be the same device or application, and can also be different devices or applications. For example, the subscription device 1 may transmit a subscription request to the server device, the subscription request includes receiving device 1, the receiving device 2, and the subscription device 1 as the receivers, which are used to receive the event notification in the case where the subscription condition is satisfied.

Next, in step S102, it is determined whether a continuous event notification rule is satisfied during a monitoring time interval. The monitoring time interval can be a period of time, such as one hour, and the time length of the monitoring time interval can be set according to specific application requirements. The step to determine whether the continuous event notification rule is satisfied is described in detail below.

Next, in step S103, in the case where the continuous event notification rule is satisfied, the event notification for the subscription request is transmitted to the at least one receiver. For example, in the case where the server device determines that the continuous event notification rule is satisfied, the event notification may be transmitted to the receiving device 1, the receiving device 2 and the subscription device 1, so as to monitor the continuous events.

According to some embodiments of the present disclosure, the event notification method may further include acquiring at least one pieces of monitored data during the monitoring time interval. For example, the monitoring device may be a water quality monitoring device, and the water quality monitoring device can periodically transmit water quality data to the server device as the monitored data. For example, the water quality monitoring device transmits the monitored water quality data to the server device every 10 minutes. Therefore, in the case that the monitoring time interval is 1 hour, the server device can receive 6 pieces of water quality data from the water quality monitoring device during the monitoring time interval.

According to an example of the present disclosure, determining whether the continuous event notification rule is satisfied may include determining whether each of the at least one pieces of monitored data satisfies an event notification rule. The event notification rule may include any one of the following: the value of the piece of monitored data is greater than a monitoring threshold, the value of the piece of monitored data is equal to the monitoring threshold, the value of the piece of monitored data is less than the monitoring threshold, the value of the piece of monitored data is not less than the monitoring threshold, and the value of the piece of monitored data is not greater than the monitoring threshold. In addition, the event notification rule can also be provided according to the actual application requirements, which is not limited herein.

Figure 3:
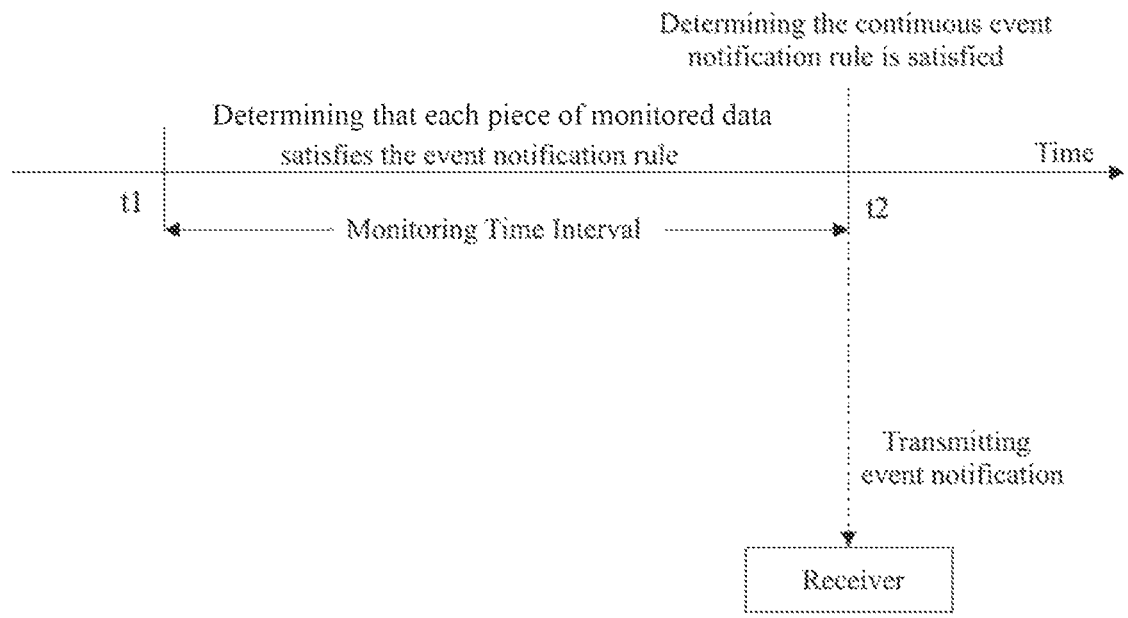
FIG. 3 illustrates a time flowchart for determining whether each piece of monitored data satisfies an event notification rule according to some embodiments of the present disclosure.

FIG. 3 illustrates a time flowchart for determining that each piece of monitored data satisfies the event notification rule according to some embodiments of the present disclosure. Taking the above-mentioned water quality monitoring as an example, the monitoring time interval may be the time period from t1 to t2, for example, be 1 hour. During the 1 hour, the server device receives six pieces of water quality data from the water quality monitoring device. Determining whether the continuous event notification rule is satisfied may include determining whether the received 6 pieces of water quality data all satisfy the event notification rule. In other words, in the case that the server device determines that each of the six pieces of the received water quality data satisfies the event notification rule (such as its value being greater than the monitoring threshold), it is determined that the continuous event notification rule is satisfied, and then, the event notification can be transmitted to the receiver.

According to another example of the present disclosure, determining whether the continuous event notification rule is satisfied may include, for each of the at least one pieces of monitored data, determining whether the event notification rule is satisfied, determining the number of the pieces of monitored data which satisfy the event notification rule, determining that the continuous event notification rule is satisfied in the case where the number is not less than a counting threshold. According to the embodiments of the present disclosure, the counting threshold may be determined based on the number of pieces of monitored data received during the monitoring time interval. For example, in the case where the number of pieces of monitored data received during the monitoring time interval is 6, the counting threshold may be set to 5, 4 or 3, or any one from 1 to 6. Different values or the same values of the counting threshold can be set in different application scenarios.

Figure 4:
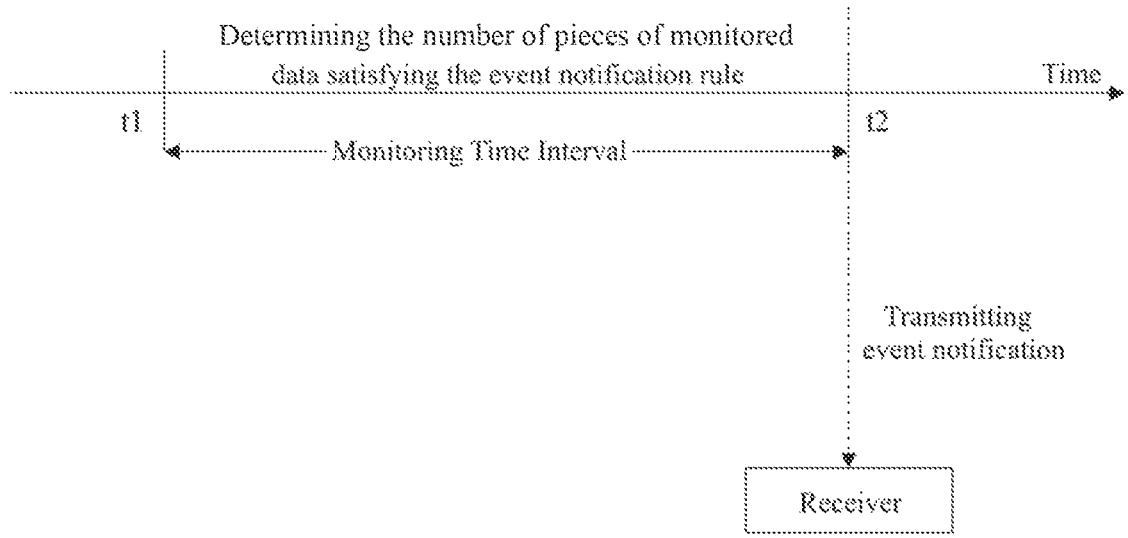
FIG. 4 illustrates a time flowchart for determining a number of pieces of monitored data satisfying the event notification rule according to some embodiments of the present disclosure.

FIG. 4 illustrates a time flowchart for determining the number of pieces of monitored data satisfying the event notification rule according to some embodiments of the present disclosure. Taking the above-mentioned water quality monitoring as an example, during the monitoring time interval (1 hour), the server device receives 6 pieces of water quality data from the water quality monitoring device, and makes determinations on each of the 6 pieces of water quality data to determine whether it satisfies the event notification rule, for example, whether its value is greater than the monitoring threshold, and determines the number of pieces of water quality data (i.e., monitored data) satisfying the event notification rule, for example, the number may be 5. Since the number is not less than the counting threshold 5, it is determined that the continuous event notification rule is satisfied, and then, the event notification can be transmitted to the receiver. According to the embodiments of the present disclosure, the event notification may be a message transmitted by the server device to one or more receivers, and the message may be associated with the subscription request. The receiver can determine that the continuous event notification rule in the subscription request is satisfied in response to receiving the message. For example, during the monitoring time interval, the value of water quality data continuously exceeds the monitoring threshold. Then, the receiver can perform further processing operations, such as finding water pollution sources and water purification treatment.

According to another example of the present disclosure, determining whether the continuous event notification rule is satisfied may include, for each of the at least one pieces of monitored data, determining whether the event notification rule is satisfied, determining a time length during which the event notification rule is satisfied based on the time intervals for the pieces of monitored data that satisfy the event notification rule, determining the continuous event notification rule is satisfied in the case where the ratio of the time length to the monitoring time interval is not less than a time threshold. The time threshold is less than or equal to 1. For example, the time threshold can be set to ⅚, and it can be determined that the continuous event notification rule is satisfied in the case where the monitoring time interval is 1 hour and the time length during which the event notification rule is satisfied is greater than or equal to 50 minutes.

Figure 5:
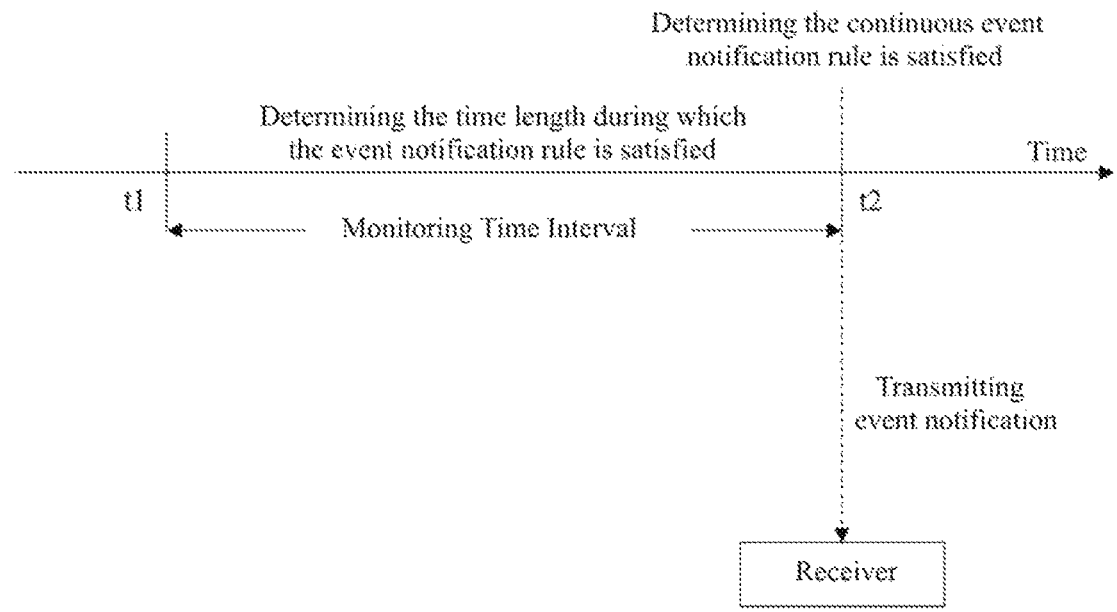
FIG. 5 illustrates a time flowchart for determining a time length during which the event notification rule is satisfied according to some embodiments of the present disclosure.

FIG. 5 illustrates a time flowchart for determining the time length during which the event notification rule is satisfied according to some embodiments of the present disclosure. Taking the above-mentioned water quality monitoring as an example, during the monitoring time interval (1 hour), the server device receives 6 pieces of water quality data from the water quality monitoring device, and makes determinations on each of the 6 pieces of water quality data to determine whether it satisfies the event notification rule, and then determines the time length during which the event notification rule is satisfied. For example, in the case that it is determined that the number of continuous pieces of water quality data (i.e., monitored data) satisfying the event notification rule is 5, and based on that the water quality monitoring device transmits water quality data to the server device every 10 minutes, i.e., the time interval for the server device to acquire water quality data is 10 minutes, it can be determined that the time length during which the event notification rule is satisfied is 50 minutes. Therefore, the ratio of the time length (50 minutes) to the monitoring time interval (1 hour, that is, 60 minutes) is equal to ⅚, that is, the ratio is not less than the time threshold, it is determined that the continuous event notification rule is satisfied, and then, the event notification can be transmitted to the receiver. For example, there are multiple points (monitored data time points) on a time axis. By determining whether the monitored data at each point satisfies the event notification rule, it is determined that whether the monitored data corresponding to each point satisfies the event notification rule. The length between adjacent points each corresponding to a piece of monitored data satisfying the event notification rule is "one time length unit during which the event notification rule is satisfied," and the sum of all time length units during which the event notification rule is satisfied is said time length during which the event notification rule is satisfied.

As another example, the monitoring time interval t can be divided into a plurality of time periods, such as three time periods ts1, ts2 and ts3 (which are not illustrated), and one or more pieces of monitored data acquired during each time period can be determined, that is, whether the one or more pieces of monitored data satisfies the event notification rule can be determined. The number of pieces of monitored data acquired during each time period is related to the length of the time period (e.g., 20 minutes) and the time interval (e.g., 10 minutes) at which the monitoring device transmits the monitored data. For example, taking three time periods ts1, ts2 and ts3 as examples, the determined results may include that the pieces of monitored data acquired during ts1 time period satisfy the event notification rule, the pieces of monitored data acquired during ts2 time period do not satisfy the event notification rule, and the pieces of monitored data acquired during ts3 time period satisfy the event notification rule, so that the time length during which the event notification rule is satisfied can be determined as ts1+ts3, and further, the ratio of the time length ts1+ts3 to the monitoring time interval t can be determined. In the case where the ratio is not less than the time threshold, it is determined that the continuous event notification rule is satisfied.

In the examples for determining whether the continuous event notification rule is satisfied or not described above in connection with FIGS. 3-5, the satisfaction of event notification rule is determined directly based on the value of monitored data, for example, determines whether the value of the monitored data is greater than the monitoring threshold, and it is determined whether the continuous event notification rule is satisfied or not based on the determined results for determining whether the monitored data satisfies the event notification rule. Therefore, the starting point of the monitoring time interval may be the time point when the server device receives the monitored data, and starting from the starting point, the water quality data can be continuously monitored during one hour, for example, for determining whether the continuous event notification rule is satisfied. In the case where it is determined that the continuous event notification rule is satisfied, the event notification can be transmitted to the receiver. In the above-mentioned water quality monitoring example, the subscription device as the receiver, after receiving the event notification, can determine that it is the enterprise sewage discharge, and perform further treatment actions without the subscription device determining "whether the water quality continues to exceed the standard during the monitoring period" as illustrated in FIG. 1A. While continuous event monitoring is realized, the requirements for the processing capacity of the subscription device are reduced, thus reducing the communication pressure between devices and improving the system efficiency. In addition, the notification interference of the subscription device caused by continuously receiving the event notification can be avoided.

According to some embodiments of the present disclosure, determining whether the continuous event notification rule is satisfied may include: in the case where it is determined that the event notification rule is satisfied, determining whether the acquired at least one pieces of monitored data satisfy a monitored data rule to obtain monitored results; determining whether the continuous event notification rule is satisfied based on the monitored results. Therefore, in this embodiment, the event notification method may further include: acquiring at least one pieces of monitored data, for example, receiving at least one pieces of monitored data from the monitoring device. For example, the monitoring device may be the water quality monitoring device that can periodically transmit water quality data to the server device as the monitored data. For example, the water quality monitoring device transmits the monitored water quality data to the server device every 10 minutes. Therefore, in the case that the monitoring time interval is 1 hour, the server device can receive 6 pieces of water quality data from the water quality monitoring device during the monitoring time interval.

In the above embodiments according to the present disclosure, the event notification rule may include at least one of the following: updating an attribute of a subscribed resource, creating a sub-resource of the subscribed resource; deleting the sub-resource of the subscribed resource; acquiring a content instance sub-resource of a subscribed container resource; receiving an operation request from a requester; and receiving a request for a certain type of operation (including the creation request, update request, deletion request, and acquisition request).

For example, after receiving the monitored data from the monitoring device, the server device can create a content instance sub-resource in the subscribed resource (the monitored data resource container) to realize operations such as data storage. It should be noted that in the above embodiments, determining whether the event notification rule is satisfied does not include analyzing and determining the content of the monitored data (such as whether the value of monitored data is greater than the monitoring threshold). In other words, the event notification rule may be a non-content determination rule. For example, the event notification rule can also be to receive an operation request from a certain requester, that is, it is determined that the event notification rule is satisfied in the case that the operation request is received from a specific requester. For example, the event notification rule may also be to update an attribute of the subscribed resource, that is, it is determined that the event notification rule is satisfied in the case that the attribute of the subscribed resource is updated. For example, the event notification rule can also be to delete a sub-resource of the subscribed resource, that is, it is determined that the event notification rule is satisfied in the case that the sub-resource of the subscribed resource is deleted. For example, the event notification rule can also be to acquire a content instance sub-resource of the subscribed container resource, that is, it is determined that the event notification rule is satisfied in the case that the sub-resource of the subscribed resource is acquired. For example, the event notification rule can also be to receive a request for a certain type of operations (including the creation request, update request, deletion request and acquisition request), that is, it is determined that the event notification rule is satisfied in the case that the certain type of request is received.

According to the embodiments of the present disclosure, determining whether the monitored data rule is satisfied, and obtaining the monitored results may include: for each of the at least one pieces of monitored data, determining whether the piece of monitored data satisfies the monitored data rule or not. In the case that the piece of monitored data satisfies the monitored data rule, the monitored result that the monitored data rule is satisfied is obtained. In the case that the piece of monitored data does not satisfy the monitored data rule, the monitored result that the monitored data rule is not satisfied is obtained.

According to an example of the present disclosure, determining whether the continuous event notification rule is satisfied may include: determining the number of the monitored results that the monitored data rule is satisfied, and determining that the continuous event notification rule is satisfied in the case that the number of monitored results that the monitored data rule is satisfied is not less than a counting threshold. The counting threshold is determined based on the number of pieces of monitored data received during the monitoring time interval. For example, in the case that the number of pieces of monitored data received during the monitoring time interval is 6, the counting threshold may be set to 5.

Figure 6:
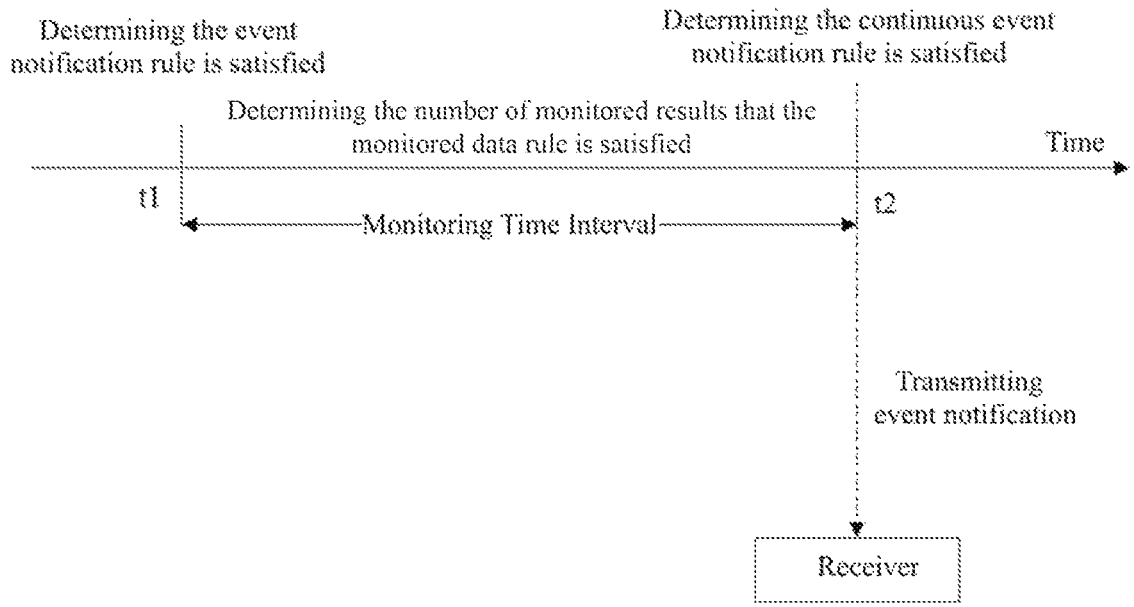
FIG. 6 illustrates a time flowchart for determining a number of monitored results that a monitored data rule is satisfied according to some embodiments of the present disclosure.

FIG. 6 illustrates a time flowchart for determining the number of monitored results that the monitored data rule is satisfied according to some embodiments of the present disclosure. First, it is determined at time point t1 that the event notification rule is satisfied, for example, a periodic monitoring request from the subscription device is received. Then, for each piece of monitored data received during the monitoring time interval indicated by t1 and t2, it is determined whether the piece of monitored data satisfies the monitored data rule, and a monitored result is obtained. Then, the number of monitored results that the monitored data rule is satisfied can be determined, for example, the number can be six. Therefore, it can be determined that the number of monitored results that the monitored data rule is satisfied is greater than the counting threshold, that is, it can be determined that the continuous event notification rule is satisfied, and then, the event notification can be transmitted to the receiver.

According to another example of the present disclosure, determining whether the continuous event notification rule is satisfied includes: determining the time length corresponding to the monitored results that the monitored data rule is satisfied, and determining that the continuous event notification rule is satisfied in the case where the ratio of the time length to the monitoring time interval is not less than a time threshold. The time threshold is less than or equal to 1. For example, the time threshold can be set to ⅚. It can be determined that the continuous event notification rule is satisfied in the case that the monitoring time interval is 1 hour and the time length during which the monitored data rule is satisfied is greater than or equal to 50 minutes.

Figure 7:
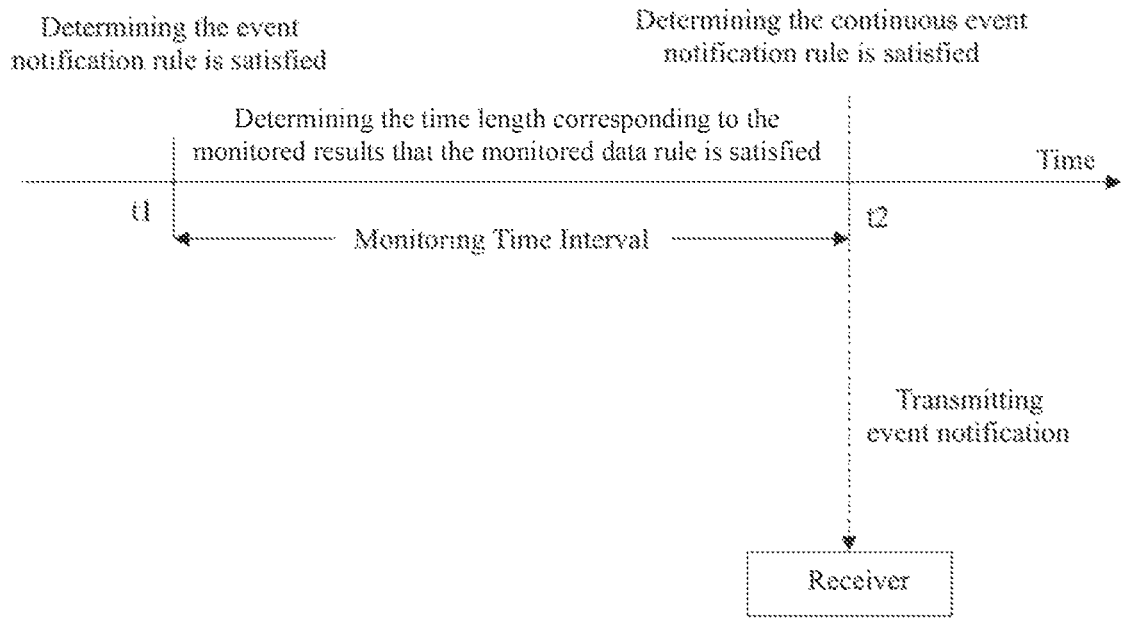
FIG. 7 illustrates a time flowchart for determining a time length corresponding to the monitored results that the monitored data rule is satisfied according to some embodiments of the present disclosure.

FIG. 7 illustrates a time flowchart for determining the time length corresponding to the monitored results that the monitored data rule is satisfied according to some embodiments of the present disclosure. Similarly, it can be determined at time point t1 that the event notification rule is satisfied, for example, the periodic monitoring request from the subscription device is received. Then, for each piece of monitored data received during the monitoring time interval, it is determined whether the piece of monitored data satisfies the monitored data rule, and the monitored result is obtained. The above-mentioned water quality monitoring is taken as an example. During the monitoring time interval (1 hour), the server device receives 6 pieces of water quality data from the water quality monitoring device, and makes determinations on each piece of water quality data to determine whether the piece of water quality data satisfies the monitored data rule, and then determines the time length during which the monitored data rule is satisfied. For example, in the case where it is determined that the number of pieces of monitored data satisfying the monitored data rule is 5, and based on the water quality monitoring device transmitting water quality data to the server device every 10 minutes, it can be determined that the time length during which the monitored data rule is satisfied is 50 minutes. Therefore, the ratio of the time length (50 minutes) to the monitoring time interval (1 hour, that is, 60 minutes) is equal to ⅚, that is, the ratio is not less than the time threshold, it is determined that the continuous event notification rule is satisfied, and then, the event notification can be transmitted to the receiver.

According to the embodiments of the present disclosure, the event notification method may further include determining a start time point and an end time point of the monitoring time interval.

Figure 8:
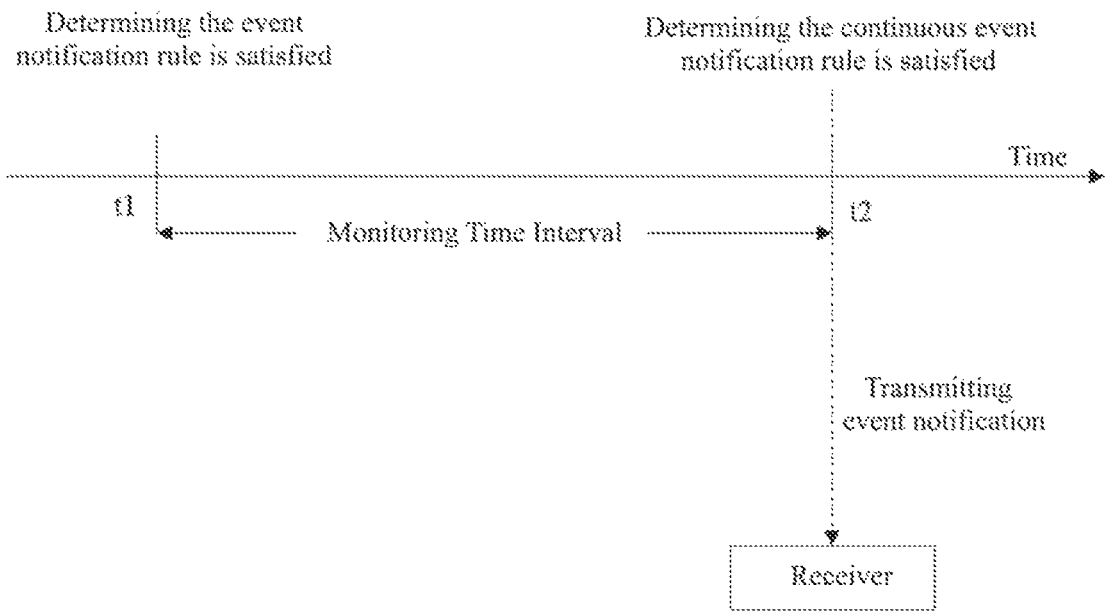
FIG. 8 illustrates a time flowchart for determining a start time point and an end time point according to some embodiments of the present disclosure.

FIG. 8 illustrates the time flowchart for determining the start time point and the end time point according to the embodiments of the present disclosure. As an example, the time point when the event notification rule is satisfied can be determined as the start time point t1, and the end time point t2 can be determined based on the monitoring time interval (for example, 1 hour) and the determined start time point t1.

Figure 9:
FIG. 9 illustrates the time flowchart for determining the start time point and the end time point according to the embodiments of the present disclosure.

FIG. 9 illustrates the time flowchart for determining the start time point and the end time point according to the embodiments of the present disclosure. As an example, the time point when the event notification rule is satisfied can be determined as the end time point t2, and then the start time point t1 is determined based on the monitoring time interval (for example, 1 hour) and the determined end time point t2.

Figure 10:
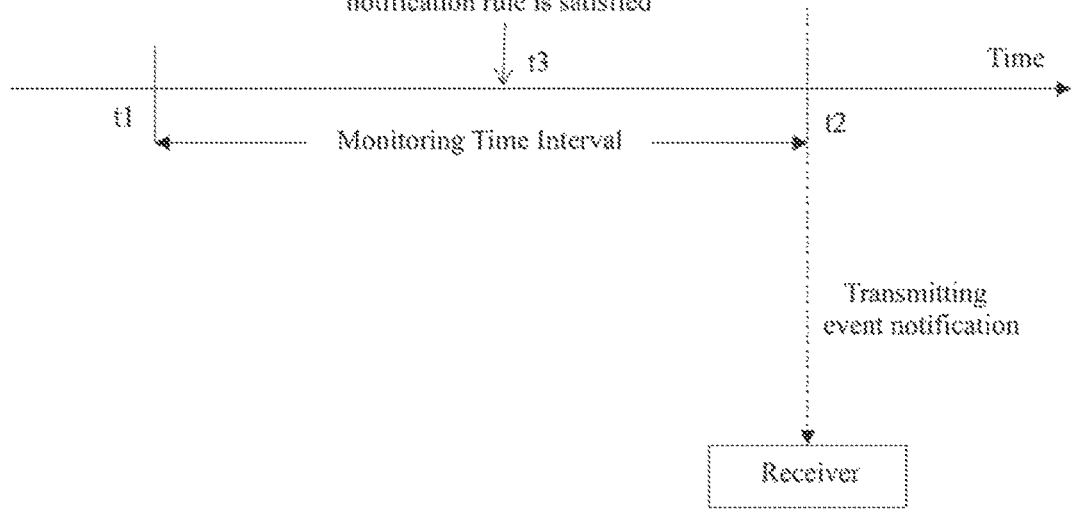
FIG. 10 illustrates the time flowchart for determining the start time point and the end time point according to the embodiment of the present disclosure.

FIG. 10 illustrates the time flowchart for determining the start time point and the end time point according to the embodiments of the present disclosure. As an example, the time point when the event notification rule is satisfied can be determined as an intermediate time point t3. Then, the start time point t1 and the end time point t2 can be determined based on the monitoring time interval (for example, 1 hour) and the determined intermediate time point t3. The intermediate time point is located between the start time point and the end time point. As illustrated in FIG. 10, the intermediate time point t3 is located between the start time point and the end time point. For example, the time interval between 30 minutes before the time point t3 when the event notification rule is satisfied and 30 minutes after the time point t3 can be determined as the monitoring time interval. Then, the server device can determine the monitored data received during the monitoring time interval, for example, for each piece of monitored data, determine whether the piece of monitored data satisfies the monitored data rule, then determine the number of monitored results that the monitored data rule is satisfied, and determine whether the continuous event notification rule is satisfied based on the set counting threshold. In the case where it is determined that the continuous event notification rule is satisfied, the event notification is transmitted to the receiver.

According to the embodiments of the present disclosure, the monitoring time interval may also be included in the subscription request. In other words, the time length of the monitoring time interval is provided by the subscription device to the server device in the subscription request. For example, the subscription device can set the monitoring time interval for the subscription request according to the actual application requirements, such as 2 days. In addition, the monitoring time interval can also be set by the server device, which is not limited thereto.

Figure 11:
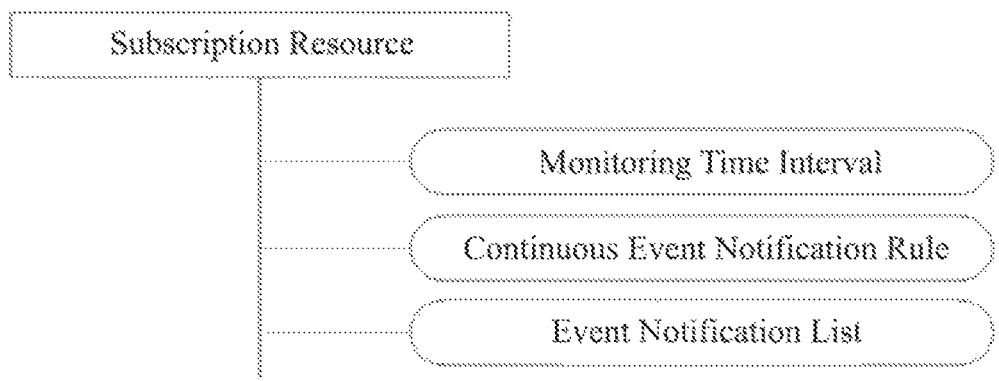
FIG. 11 illustrates a schematic diagram of a resource structure of a subscribed resource according to some embodiments of the present disclosure.

According to the embodiments of the present disclosure, the event notification method may further include creating a subscription resource. FIG. 11 illustrates a resource structure diagram of the subscription resource according to the embodiments of the present disclosure. As illustrated in FIG. 11, the subscription resource includes a plurality of attributes, for example, a monitoring time interval attribute used for determining the monitoring time interval, a continuous event notification rule attribute used for determining whether to transmit an event notification to at least one receiver, and an event notification list attribute used for storing address information of the at least one receiver. The server device can implement the event notification method according to the present disclosure based on the set subscription resource. It should be noted that there are other attributes for other functions in the subscription resource, which are not limited thereto.

Figure 12A:
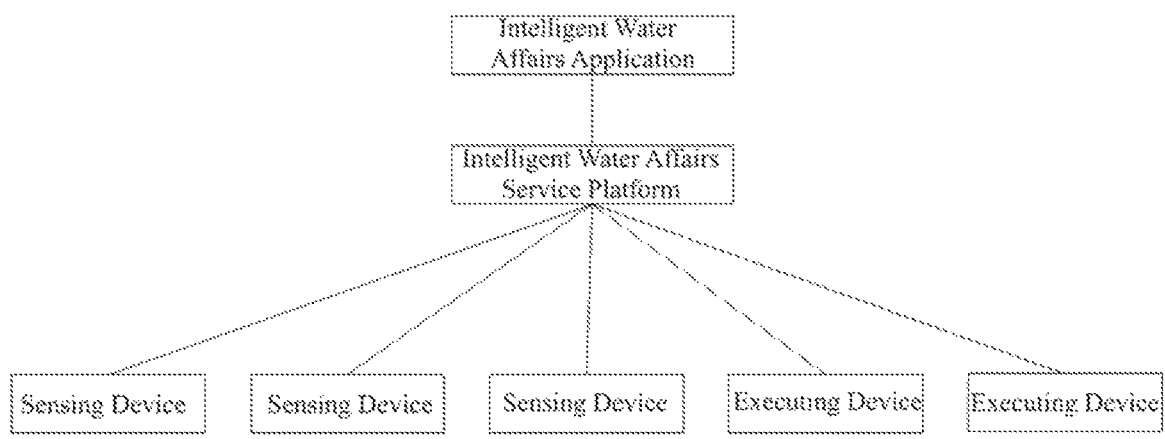
FIG. 12A illustrates a schematic diagram of a system according to some embodiments of the present disclosure.
Figure 12B:
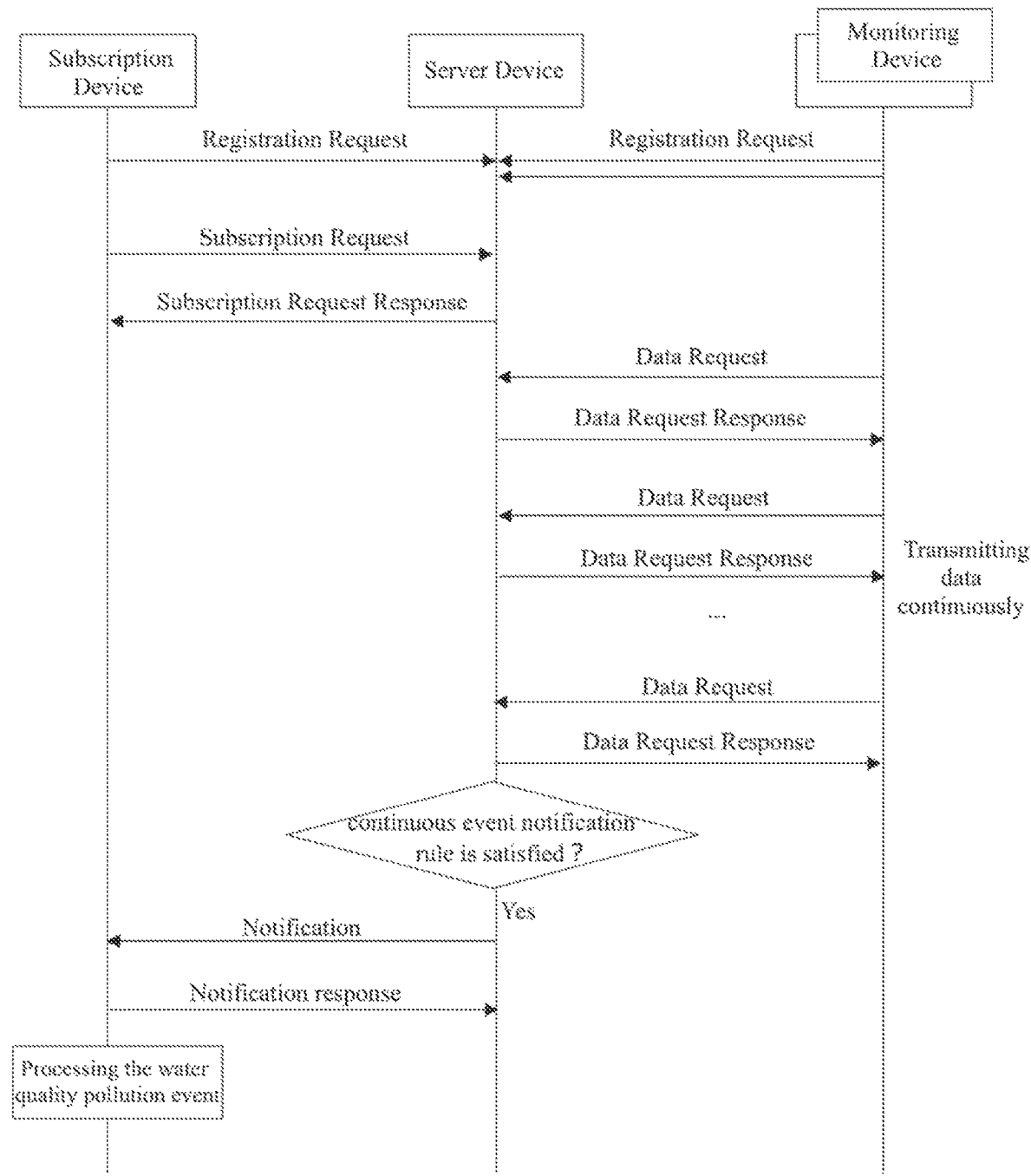
FIG. 12B illustrates a process flowchart for a continuous event notification according to some embodiments of the present disclosure.

FIG. 12A illustrates the system schematic diagram according to the embodiments of the present disclosure, and FIG. 12B illustrates the processing flowchart of continuous event notification according to the embodiments of the present disclosure. Next, the overall flow of event notification according to the event notification method of the present disclosure is described with reference to FIGS. 12A and 12B.

As illustrated in FIG. 12A, taking the intelligent water affairs application as an example, the sensing device, the executing device and the intelligent water affairs application can be connected to the intelligent water affairs service platform by transmitting a registration request. The sensing device can be used as the monitoring device, the intelligent water affairs application can be used as the subscription device, and the intelligent water affairs service platform can be used as the server device.

As illustrated in FIG. 12B, the subscription device and the monitoring device can respectively transmit the registration request to the server device and receive the registration response transmitted by the server device, thereby connecting to the server device, and the server device is responsible for managing the devices accessing it. The monitoring device can be one or more devices, which is not limited thereto.

Next, the subscription device can transmit a subscription request to the server device, and the subscription request includes the continuous event notification rule and the monitoring time interval. In response to the received subscription request, the server device can create a subscription resource, for example, as illustrated in FIG. 11.

Next, during the monitoring time interval, the monitoring device can continuously transmit data to the server device in the form of the data request, and receive the data request response returned by the server device. For example, in the case that the server device determines that each piece of monitored data during the monitoring time interval satisfies the event notification rule, it is determined that the continuous event notification rule is satisfied. Then, the event notification is transmitted to the subscription device. After receiving the event notification, the subscription device can process the notified water pollution event. For example, in response to the received event notification, the intelligent water affairs application illustrated in FIG. 12A can transmit control instructions to the executing device through the intelligent water affairs service platform.

In the event notification method provided by the present disclosure described above in combination with specific embodiments, during the monitoring time interval, the server device determines whether the continuous event notification rule is satisfied, and transmits the event notification to the receiver in the case that the continuous event notification rule is satisfied. The event notification method according to the embodiments of the present disclosure can meet the application requirements for monitoring continuous events, improve the system efficiency, reduce the requirements for the processing capacity of the subscription device, and reduce the communication pressure between devices. In addition, the notification interference of the subscription device caused by continuously receiving the event notification can be avoided.

Figure 13:
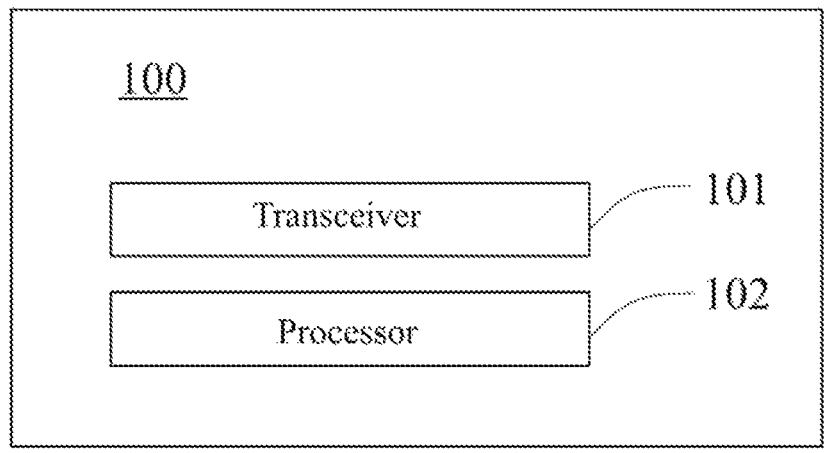
FIG. 13 illustrates a schematic block diagram of a server device according to some embodiments of the present disclosure.

According to the embodiments of the present disclosure, the server device is also provided. FIG. 13 illustrates the schematic diagram of the server device according to the embodiments of the present disclosure. The server device 100 may include a transceiver 101 and a processor 102. The transceiver 101 may be configured to receive a subscription request from a subscription device, and the subscription request includes at least one receiver used for receiving an event notification. The processor 102 may be configured to determine whether the continuous event notification rule is satisfied during a monitoring time interval. In addition, the processor 102 can also be configured to instruct the transceiver 101 to transmit the event notification for the subscription request to the at least one receiver in the case where the continuous event notification rule is satisfied. The transceiver 101 is further configured to transmit the event notification for the subscription request to the at least one receiver in the case where the continuous event notification rule is satisfied.

Optionally, the server device 100 may also have a built-in or an external memory, for example, for storing resources created for terminal devices, and for storing related instructions, when executed by the processor 102, the steps of the event notification method can be implemented.

Figure 14:
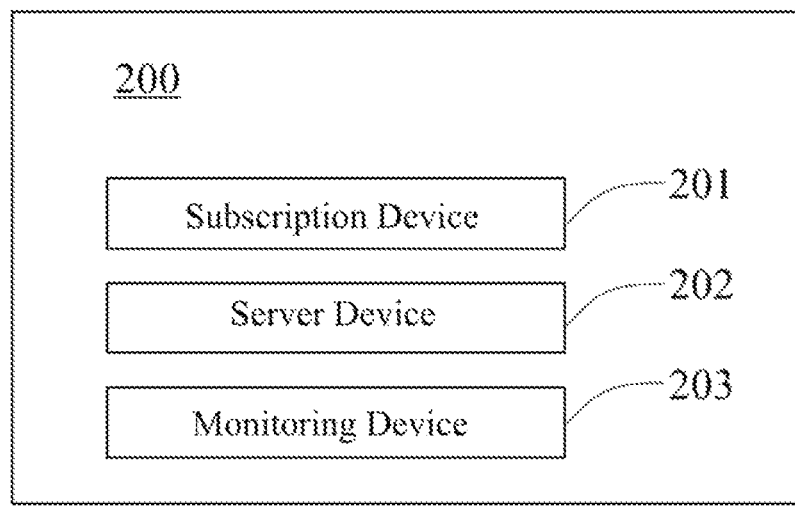
FIG. 14 illustrates a schematic block diagram of an event notification system according to some embodiments of the present disclosure.

According to the embodiments of the present disclosure, an event notification system is also provided. FIG. 14 illustrates the schematic diagram of the event notification system according to the embodiments of the present disclosure. The event notification system 200 may include a subscription device 201 and a server device 202. The subscription device 201 is configured to send a subscription request to the server device 202. The subscription request includes at least one receiver used for receiving an event notification. According to the embodiments of the present disclosure, the at least one receiver may include the subscription device 201 or other devices in addition to the subscription device 201.

The server device 202 may be configured to receive the subscription request from the subscription device, determine whether the continuous event notification rule is satisfied during a monitoring time interval, and transmit the event notification for the subscription request to the at least one receiver in the case where the continuous event notification rule is satisfied.

According to the embodiments of the present disclosure, the event notification system 200 may further include a monitoring device 203. The monitoring device 203 may be configured to transmit monitored data to the server device 202. The server device 202 may also be configured to receive at least one pieces of monitored data from the monitoring device during the monitoring time interval.

According to the embodiments of the present disclosure, a computer storage medium is also provided. The computer storage medium stores computer readable code, when executed by one or more processors, the event notification method as described above is implemented, which is not be repeated. The computer storage medium can be any available storage medium that can be accessed by a computer. For example, the computer-readable storage medium includes but is not limited to the volatile memory and/or nonvolatile memory. The volatile memory may include, for example, the random access memory (RAM) and/or a cache. The nonvolatile memory may include, for example, the read-only memory (ROM), hard disk, flash memory, etc. Alternatively, the computer storage medium can be any other medium that can be used to carry or store desired program code in the form of instructions or data structures and can be accessed by a computer.

Those skilled in the art can understand that many variations and improvements can be made to the present disclosure. For example, various devices or components described above can be realized by hardware, or by software, firmware, or a combination of some or all of the three.

Furthermore, although the present disclosure makes various references to some units in the system according to the embodiments of the present disclosure, any number of different units can be used and run on a client terminal and/or server. The units are only illustrative, and different aspects of the system and method can use different units.

Unless otherwise defined, all terms (including technical and scientific terms) used herein have the same meaning as commonly understood by ordinary people in the field to which the present disclosure belongs. It should also be understood that the terms such as those defined in general dictionaries should be interpreted as having meanings consistent with their meanings in the context of related technologies, and should not be interpreted in an idealized or extremely formal sense, unless explicitly defined here.

The above is the description of the present disclosure and should not be considered as a limitation thereof. Although several exemplary embodiments of the present disclosure have been described, those skilled in the art will easily understand that many modifications can be made to the exemplary embodiments without departing from the novel teachings and advantages of the present disclosure. Therefore, all these modifications are intended to be included within the scope of the present disclosure as defined by the claims. It should be noted that the above is the description of the present disclosure and should not be considered as limited to the specific embodiments disclosed, and the modifications of the disclosed embodiments and other embodiments are intended to be included within the scope of the appended claims. The present disclosure is defined by the claims and their equivalents.

This application claims the priority of Chinese patent application No. 201910872383.4, which was filed on Sep. 16, 2019, and whose invention name is "Event notification method, system, server device, and computer storage medium." The disclosure of the above-mentioned Chinese patent application is hereby cited in its entirety as a part of this application.

What is claimed is:

1. An event notification method, comprising:
   receiving a subscription request from a subscriber, wherein the subscription request comprises at least one receiver used for receiving an event notification;
   determining whether a continuous event notification rule is satisfied during a monitoring time interval; and
   transmitting the event notification for the subscription request to the at least one receiver in a case that the continuous event notification rule is satisfied,
   wherein determining whether the continuous event notification rule is satisfied comprises:
   in a case that it is determined that an event notification rule is satisfied, for at least one pieces of monitored data acquired during the monitoring time interval, determining whether a monitored data rule is satisfied and obtaining monitored results, and
   determining whether the continuous event notification rule is satisfied based on the monitored results,
   wherein, a start time point and an end time point of the monitoring time interval are determined by one of:
   determining a time point when the event notification rule is satisfied as the start time point, and determining the end time point based on the monitoring time interval and the determined start time point; or
   determining a time point when the event notification rule is satisfied is determined as the end time point, and determining the start time point based on the monitoring time interval and the determined end time point; or
   determining a time point when the event notification rule is satisfied is determined as an intermediate time point, and determining the start time point and the end time point based on the monitoring time interval and the determined intermediate time point, and the intermediate time point is between the start time point and the end time point.

2. The event notification method of claim 1, wherein the event notification rule comprises at least one of the following: updating an attribute of a subscribed resource; creating a sub-resource of the subscribed resource; deleting the sub-resource of the subscribed resource; acquiring a content instance sub-resource of a subscribed container resource; receiving an operation request from a certain requester; and receiving a request for a certain type of operations, and
   the monitored data rule comprises any one of the following: a value of a piece of monitored data being greater than a monitoring threshold; the value of the piece of monitored data being equal to the monitoring threshold; the value of the piece of monitored data being less than the monitoring threshold; the value of the piece of monitored data being not less than the monitoring threshold; and the value of the piece of monitored data being not greater than the monitoring threshold.

3. The event notification method of claim 1, wherein determining whether the monitored data rule is satisfied and obtaining the monitored results comprises:
   for each piece of monitored data of the at least one piece of monitored data, determining whether the piece of monitored data satisfies the monitored data rule,
   obtaining a monitored result that the monitored data rule is satisfied in a case that the piece of monitored data satisfies the monitored data rule; and obtaining the monitored result that the monitored data rule is not satisfied in a case that the piece of monitored data does not satisfy the monitored data rule.

4. The event notification method of claim 3, wherein determining whether the continuous event notification rule is satisfied comprises:
   determining a number of monitored results that the monitored data rule is satisfied; and
   determining the continuous event notification rule is satisfied in a case where the number of monitored results that the monitored data rule is satisfied is not less than a counting threshold, wherein the counting threshold is determined based on a number of pieces of monitored data received during the monitoring time interval.

5. The event notification method of claim 3, wherein determining whether the continuous event notification rule is satisfied comprises:
   determining a time length corresponding to the monitored results that the monitored data rule is satisfied;
   determining the continuous event notification rule is satisfied in a case where a ratio of the time length to the monitoring time interval is not less than a time threshold, wherein the time threshold is less than or equal to 1.

6. The event notification method of claim 1, wherein the subscription request further comprises the monitoring time interval, and the event notification method further comprises: creating a subscription resource, wherein the subscription resource comprises the following attributes:
   a monitoring time interval attribute, used for determining the monitoring time interval;
   a continuous event notification rule attribute, used for determining whether to transmit the event notification to the at least one receiver; and
   an event notification list attribute, used for storing address information for the at least one receiver.

7. A non-transitory computer storage medium stored with computer readable code, when executed by one or more processors, causing the one or more processors to perform the event notification method of claim 1.

8. A server device, comprising a transceiver and a processor,
   wherein the transceiver is configured to receive a subscription request from a subscriber, and the subscription request comprises at least one receiver used for receiving an event notification;
   the processor is configured to determine whether a continuous event notification rule is satisfied during a monitoring time interval; and
   the transceiver is further configured to transmit the event notification for the subscription request to the at least one receiver in a case where the continuous event notification rule is satisfied,
   wherein when determining whether the continuous event notification rule is satisfied, the processor is configured to:
   in a case that it is determined that an event notification rule is satisfied, for at least one pieces of monitored data acquired during the monitoring time interval, determine whether a monitored data rule is satisfied and obtaining monitored results, and determine whether the continuous event notification rule is satisfied based on the monitored results, wherein, a start time point and an end time point of the monitoring time interval are determined by one of:

determining a time point when the event notification rule is satisfied as the start time point, and determining the end time point based on the monitoring time interval and the determined start time point; or determining a time point when the event notification rule is satisfied is determined as the end time point, and determining the start time point based on the monitoring time interval and the determined end time point; or determining a time point when the event notification rule is satisfied is determined as an intermediate time point, and determining the start time point and the end time point based on the monitoring time interval and the determined intermediate time point, and the intermediate time point is between the start time point and the end time point.

9. The server device of claim 8, wherein when determining whether the monitored data rule is satisfied and obtaining the monitored results, the processor is configured to:

for each piece of monitored data of the at least one piece of monitored data, determining whether the piece of monitored data satisfies the monitored data rule, obtaining a monitored result that the monitored data rule is satisfied in a case that the piece of monitored data satisfies the monitored data rule; and obtaining the monitored result that the monitored data rule is not satisfied in a case that the piece of monitored data does not satisfy the monitored data rule.

10. The server device of claim 8, wherein when determining whether a continuous event notification rule is satisfied during a monitoring time interval, the processor is configured to:

determining a number of monitored results that the monitored data rule is satisfied; and determining the continuous event notification rule is satisfied in a case where the number of monitored results that the monitored data rule is satisfied is not less than a counting threshold, wherein the counting threshold is determined based on a number of pieces of monitored data received during the monitoring time interval.

11. The server device of claim 8, wherein when determining whether a continuous event notification rule is satisfied during a monitoring time interval, the processor is configured to:

determining a time length corresponding to the monitored results that the monitored data rule is satisfied;

determining the continuous event notification rule is satisfied in a case where a ratio of the time length to the monitoring time interval is not less than a time threshold, wherein the time threshold is less than or equal to 1.

12. An event notification system, comprising:

a subscription device, configured to transmit a subscription request to a server device, wherein the subscription request comprises at least one receiver used for receiving an event notification;

the server device, configured to:

receive the subscription request from the subscription device;

acquire at least one pieces of monitored data;

determine whether a continuous event notification rule is satisfied during a monitoring time interval; and transmit the event notification for the subscription request to the at least one receiver in a case where the continuous event notification rule is satisfied; and a monitoring device, configured to transmit monitored data to the server device, wherein when determining whether the continuous event notification rule is satisfied, the server device is configured to:

in a case that it is determined that an event notification rule is satisfied, for at least one pieces of monitored data acquired during the monitoring time interval, determine whether a monitored data rule is satisfied and obtaining monitored results, wherein the event notification rule is a non-content determination rule, and determine whether the continuous event notification rule is satisfied based on the monitored results, wherein, a start time point and an end time point of the monitoring time interval are determined by one of:

determining a time point when the event notification rule is satisfied as the start time point, and determining the end time point based on the monitoring time interval and the determined start time point; or determining a time point when the event notification rule is satisfied is determined as the end time point, and determining the start time point based on the monitoring time interval and the determined end time point; or determining a time point when the event notification rule is satisfied is determined as an intermediate time point, and determining the start time point and the end time point based on the monitoring time interval and the determined intermediate time point, and the intermediate time point is between the start time point and the end time point.

* * * * *